United States Patent [19]

Ohmer

[11] Patent Number: 4,461,997
[45] Date of Patent: Jul. 24, 1984

[54] NON-CONDUCTIVE LOGGING SONDE HOUSING

[75] Inventor: Hervé Ohmer, Antony, France

[73] Assignee: Schlumberger Technology Corp., Houston, Tex.

[21] Appl. No.: 236,163

[22] Filed: Feb. 20, 1981

[30] Foreign Application Priority Data

Feb. 29, 1980 [FR] France ................... 80 04535

[51] Int. Cl.³ .................... G01V 3/18; H05K 5/00
[52] U.S. Cl. ...................... 324/338; 73/152; 174/52 S; 324/323
[58] Field of Search ............ 324/323, 334–344, 324/347; 73/152; 250/256, 265; 174/141 R, 150, 179, 52 S; 336/90, 92

[56] References Cited

U.S. PATENT DOCUMENTS

| 2,633,485 | 3/1953 | Patnode ............... 324/347 |
| 2,857,451 | 10/1958 | Barclay . |
| 3,065,404 | 11/1962 | Mayes et al. . |
| 3,377,549 | 4/1968 | Newman et al. . |
| 3,403,328 | 9/1968 | Fossati et al. . |
| 4,278,942 | 7/1981 | Bonnet et al. ............... 324/347 |

FOREIGN PATENT DOCUMENTS

| 2058451 | 5/1971 | France . |
| 911001 | 11/1962 | United Kingdom ........... 174/179 |

*Primary Examiner*—Gerard R. Strecker

[57] ABSTRACT

A logging sonde housing includes a stack of ceramic rings (26) surrounded by a first layer (33) of reinforced plastic material. Elastic seals (28) are placed between the rings and kept under compression by the layer of plastic material. A second elastomeric layer (34) is provided around the plastic material to ensure sealing. A third layer (35) of reinforced plastic material protects the elastomer, and a fourth layer (36) of a fabric impregnated with a more resilient plastic material improves the abrasion and shock resistance. The assembly forms a housing (18) resistant to borehole pressure for receiving, for example, electromagnetic transducers of the antenna or coil type.

9 Claims, 8 Drawing Figures

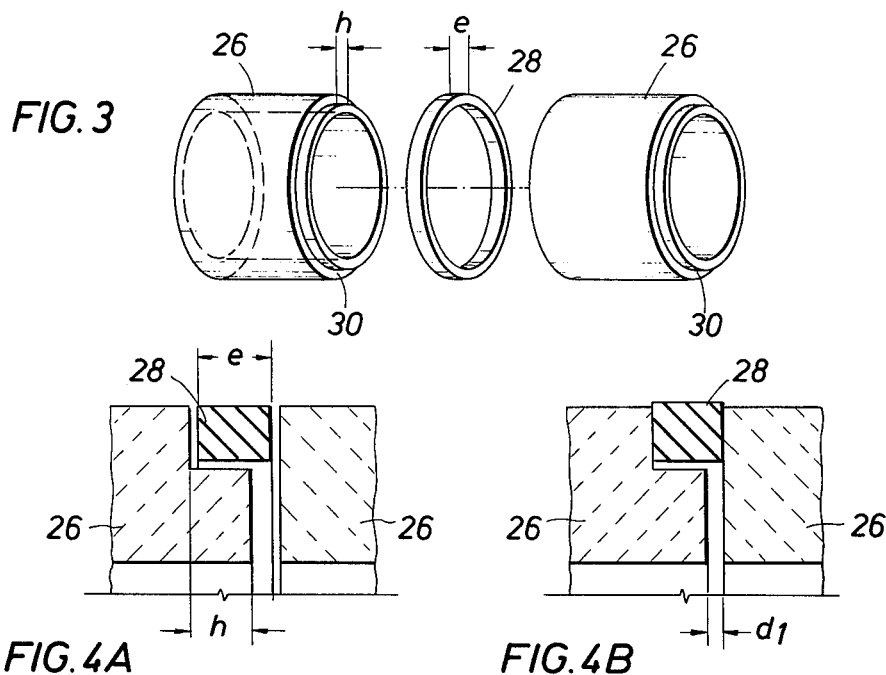
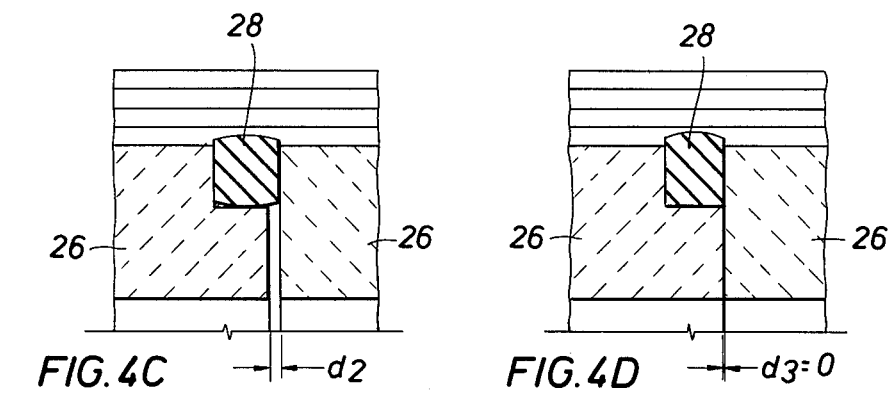
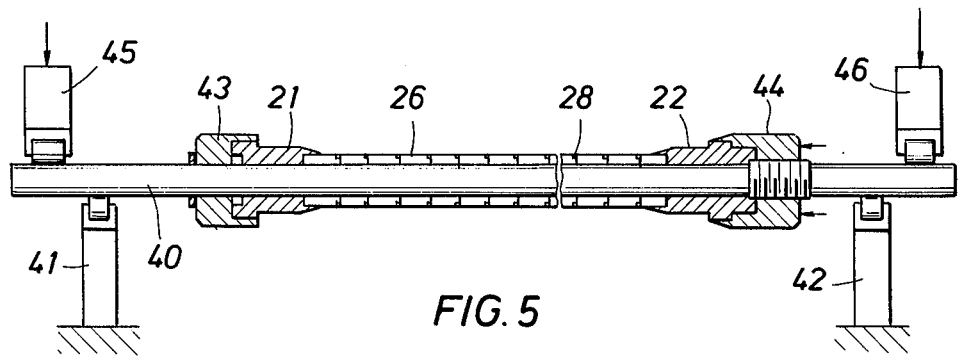

NON-CONDUCTIVE LOGGING SONDE HOUSING

BACKGROUND OF THE INVENTION

This invention relates to logging apparatus used in boreholes, and more particularly to an improved sonde housing for such apparatus.

Logging apparatus which is used for the study of formations penetrated by a borehole includes a sonde lowered into the borehole at the end of a cable. The sonde is generally made up of several sealed housings connected end to end mechanically and electrically. These sealed housings can be filled with air at atmospheric pressure or with a hydraulic fluid kept at the pressure of the borehole. They contain transducers for the acquisition of measurements, and electronic circuits for the electric power supply of the transducers or processing of detected measurement signals. These housings are generally metallic cylinders equipped with heads mounted in a sealed manner at their ends.

For certain logs, it is not possible to use housings made of conductive material, as this would constitute a screen between the transducers and the formations. Such logs particularly include those involving the use of coil or antenna type transducers for the measurement of electrical resistivity (or conductivity), dielectric constant, nuclear magnetic resonance, or other characteristics of the formations traversed by the borehole.

U.S. Pat. No. 2,857,451 (H. A. Barclay) describes a nonconducting housing capable of resisting borehole pressures. That housing is made up of internal ceramic cylinders surrounded by an external cylinder made up of a fabric impregnated with thermosetting plastic material. The internal cylinders resist pressure, while the external cylinder provides sealing and is resistant to axial tensions and shocks.

Another nonconducting and pressure-resisting housing is described in U.S. Pat. No. 3,403,328 (F. N. Fossati et al) and a particular embodiment is represented in FIGS. 7A and 7B thereof. That housing includes a stack of internal ceramic discs and an external layer of glass-fiber reinforced resin. In addition, glass-fiber strips are tensioned between the ends of the sonde to apply an axial-compression prestress to the stack of discs. The discs withstand the borehole pressure and the intermediate layer resists longitudinal tensions.

In the above-described housings, thought was given to the use of stacked ceramic rings whose compression strength is very high. The low tensile strength of the ceramic material is compensated by an additional layer adapted to support the longitudinal forces. Those housings however have several drawbacks. Ceramic material is very sensitive to shocks. Since the rings are in contact with each other, the shocks are transmitted directly from one ring to another with no damping. One or several rings are thus capable of breaking, in particular during surface operations for introducing the apparatus into the borehole, during which substantial shocks can occur. Further, under the severe conditions prevailing in boreholes, the resins are subjected to more or less rapid deterioration due to hydrolysis by the borehole fluids. Such degradation is particularly troublesome at the junctions between the resin and the connecting parts of the ends, where the traction forces are applied.

It is therefore an object of the invention to provide a nonconducting housing for logging apparatus which withstands the borehole pressure and resists shocks in a particularly satisfactory manner.

Another object of the invention is to provide a non-conducting, pressure-resisting housing exhibiting excellent resistance to pressure and degradation by borehole fluids.

The object of the invention also covers a method for manufacturing such a housing.

SUMMARY OF THE INVENTION

In accordance with the invention, a sonde housing for logging apparatus comprises end pieces for the connection of the housing and, between these end pieces, a stack of ceramic rings arranged coaxially to form a cylinder resistant to compressive forces from the hydrostatic pressure of the borehole. The inside of this cylinder is adapted to receive elements such as transducers or electronic circuits for the acquisition of measurements in the borehole. A reinforced plastic material layer, placed outside the stack of rings, is fixed between the end pieces to resist the longitudinal forces applied to the housing. In addition, elastic seals are placed between the rings and kept under compression by the layer of plastic material, preventing direct contact between the faces of the successive rings and applying an axial compression force to these rings during the surface handling of the housing, before its introduction into the borehole. Each seal is kept substantially centered by a shoulder made on one end face of each ring.

The housing also includes a layer of elastomeric material placed around the plastic material to improve its sealing with respect to the borehole fluids. An additional layer of reinforced plastic material, itself surrounded by another layer of fabric impregnated with more resilient plastic, improves the overall wear and shock resistance. Preferably, the layers of reinforced plastic material are made by the filament winding of glass fibers impregnated with thermosetting resin.

A method for manufacturing such a sonde housing comprises the following steps:

slipping a first end piece, a stack of ceramic rings equipped with elastic seals, and a second end piece onto a rotatably mounted and supported mandrel between stops on the mandrel;

compressing the seals between the end pieces by bringing the stops toward each other using tightening means;

turning the mandrel while helically applying a reinforced plastic filament winding on the rings, the end pieces and the stops; and polymerizing the filament material while maintaining the compression on the seals.

During polymerization, the mandrel is made to turn and vertical downward forces are applied to its ends to compensate for the deflection created on the mandrel by the weight applied between the supports.

The manufacturing methods further comprises a step for applying an elastomer coating around the filament winding, and a step for applying another filament winding of reinforced plastic material around the elastomer layer. Finally, another step consists in winding a layer of fabric impregnated with more resilient plastic material around the outer filament winding for better shock absorption and better abrasion resistance.

BRIEF DESCRIPTION OF THE DRAWINGS

The characteristics and advantages of the invention will moreover better appear from the description to follow given by way of nonlimitative example with reference to the appended drawings in which:

FIG. 3 is a perspective view of the internal rings used in the housing of FIG. 2;

FIGS. 4A and 4D are longitudinal sections of several configurations of seals placed between the internal rings of the housing for different housing manufacturing and utilization conditions; and FIG. 5 is a diagram of the manufacturing system used for the housing of FIG. 2.

DESCRIPTION OF THE PREFERRED EMBODIMENT

Figure 1:
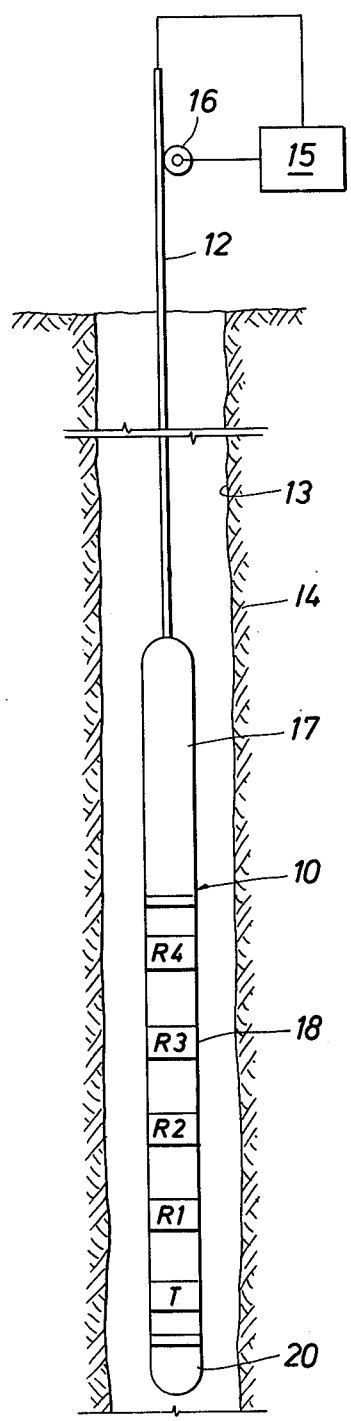
FIG. 1 represents a logging sonde equipped with a housing according to the invention and shown in a borehole.

Referring to FIG. 1, a logging apparatus comprises a sonde 10 suspended at the end of a cable 12 in a borehole 13 which traverses earth formations 14. The sonde 10 can be moved along the borehole 13 by means of a winch (not shown) on which winds the cable 12. Surface equipment 15 provides electric power to the sonde 10 via conductors in the cable, and processes the measurement information coming from the sonde. This information is recorded as a function of the depth of the sonde 10, the depth being obtained by detecting movements of the cable with a depth measurement device 16.

The sonde 10 is, for example, of the type described in French Pat. No. 2,404,235 (inventors: S. Huchital and J. Tabanou) which determines the dielectric constant and the conductivity of the formations. The sonde includes an upper metallic housing 17 containing electronic circuits, and a lower housing 18 which, according to the invention, is fixed to the end of the upper housing 17. As explained in the above-mentioned patent, the housing 18 contains electromagnetic transducers consisting of coils or antennas, including a transmitter T, two near receivers R1 and R2, and two remote receivers R3 and R4. The amplitude attenuation between the signals detected by the receivers R1 and R2 and the dephasing between the signals detected by the receivers R3 and R4 are combined to furnish the dielectric constant and the electrical conductivity of the formations. Since the transducers are coils or antennas which transmit or receive electromagnetic energy, the housing 18 which contains them must be nonconducting. An improved housing according to the invention is shown in FIG. 2.

Figure 2:
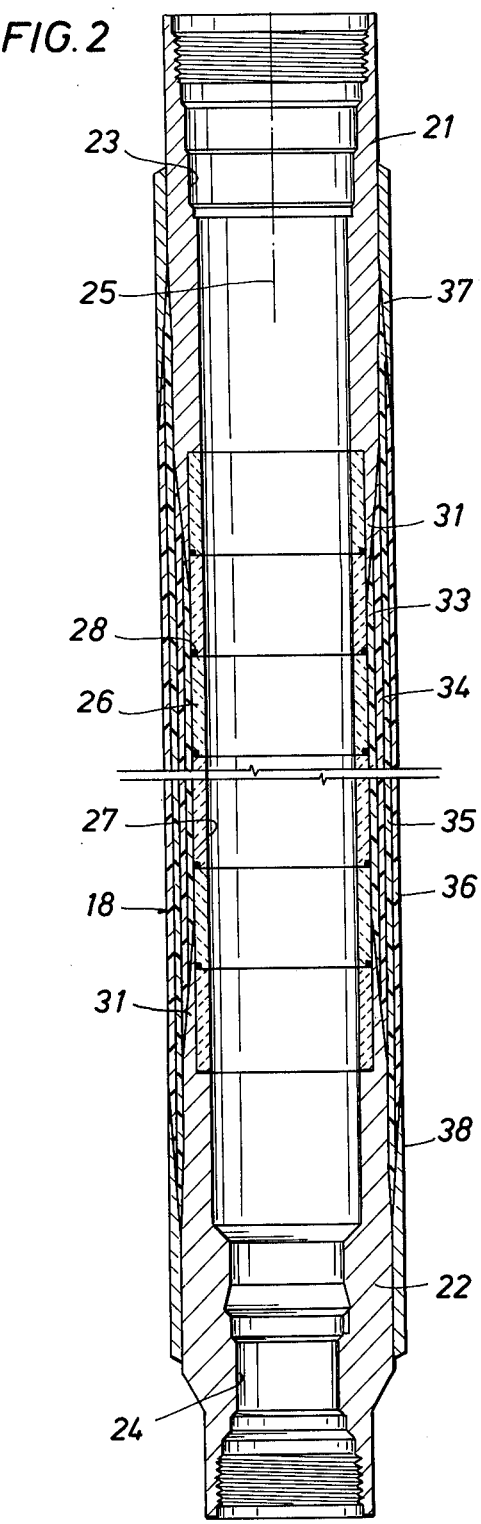
FIG. 2 is a longitudinal section of the sonde housing according to the invention.

Referring to FIG. 2, the housing 18 is shown without internal parts such as transducers, wiring or electronic circuits, and without the connection heads which are screwed onto the ends to provide mechanical and electrical links with the adjacent sonde elements 17 and 20. These connecting heads, of conventional type, do not form part of the invention and will not be described here. Such connecting heads are screwed into upper and lower end pieces 21 and 22, respectively, traversed by axial bores 23 and 24 equipped respectively with tappings.

Between the end pieces 21 and 22 is placed, along the axis 25 of the housing, a stack of ceramic rings 26 made up of certain fritted metallic oxides, such as alumina. These rings define along the housing, in the extension of the bores 23 and 24, a cavity 27 in which are placed, on an internal support, the electromagnetic transducers T and R1 to R4. The electromagnetic transducers could also be coils or antennas made on the external surface of some of the ceramic rings 26 and protected by the resin layers around these rings.

The rings 26 are separated from each other by elastomeric seals 28, for example neoprene, inserted by clamping them into peripheral grooves 30 cut into the upper part of each ring (FIG. 3). The internal faces of the grooves 30 thus form shoulders which maintain the seals 28 in place in a centered manner with respect to the rings. The height of the rings is of the order of about 0.5 to about once their diameter to obtain a sufficiently flexible stack at a reasonable cost.

FIGS. 4A and 4B represent the configuration of the seals 28 during two stages of the manufacture of the housing. FIGS. 4C and 4D represent the configuration of the seals 28 when the housing is at atmospheric pressure (FIG. 4C) and when it is subjected to a high hydrostatic pressure at the bottom of borehole (FIG. 4D).

The seals 28, whose thickness e at rest is greater than the height h of the grooves 30 (FIG. 4A), are chosen to prevent contact between the faces of the successive rings when the housing is subjected to a low external pressure, i.e., in particular during surface handling of the apparatus before its introduction into a borehole. The rings are then spaced by a small distance d2 (FIG. 4C). However, under the effect of a strong compression, such as that which is applied in the borehole to a housing 18 filled with air at atmospheric pressure, the seals can be crushed elastically to a point where the faces of the successive rings are in contact (distance d3=0, FIG. 4D). The housing is then much more fragile, but the shocks are clearly less violent because they are damped by the borehole fluids in which the apparatus is immersed. As will be seen later, the seals 28 are subjected during construction to a compression prestress (FIG. 4B). Owing to the elasticity of the elastomer, this prestress is applied to the opposite faces of the ceramic rings, which are thus kept in place firmly but elastically. The seal 28 therefore have a double function, i.e., maintaining the compression of the ceramic rings and shock absorption.

The end pieces 21 and 22 include a recess into which fit the first ceramic rings. Adjacent the rings 26, each end piece has a conical surface 31 (FIG. 2) in which are cut circular grooves for better adhesion between these parts and a first layer 33 placed around the rings 26. This first layer 33 consists of a reinforced theremosetting resin, and preferably a helical filament winding of epoxy-impregnated glass-fiber wicks. The winding is made with a large pitch in order to offer high tensile strength. Around the first layer 33 is provided a second layer 34 consisting of a coating of an elastomer such as neoprene. This coating is extended up to the end pieces 21 and 22 and improves the sealing of the housing with respect to borehole fluids which may eventually contaminate the resin layer by hydrolysis. Around the second layer 34 is provided a third layer 35 made in the same manner and with the same epoxy material and glass fibers as the first layer 33. In addition, a fourth layer 36 consisting of a glass-fiber fabric impregnated with a more resilient resin, for example epoxy, is provided around the third layer. This more resilient resin is more suitable for shock absorption, and the fabric has a better abrasion resistance than a filament winding.

The ends of the third and fourth layers machined in conical form receive metallic ferrules 37 and 38 to reinforce these ends.

The different layers are combined to provide a non-conducting housing resistant to shocks and pressures and exhibiting good sealing.

The ceramic rings 26 are resistant to the radial and axial compression due to the pressure of the boreholes, which can exceed 1500 bars. On the other hand, these rings have a very low tensile and impact strength. The longitudinal traction forces which are applied to the end pieces 21 and 22 are maintained by the first layer 33 of epoxy and glass fibers firmly fixed to the end pieces thanks to the conical surfaces 31 and the circular grooves. The neoprene layer 34 improves the resistance of the housing to degradation by borehole fluids. The outer layers 35 and 36 protect the layer 34 and improve shock resistance.

In one embodiment of the invention, good results were obtained with a housing of 115 mm outer diameter in which the alumina rings had a thickness of 5 mm and a height of 60 mm, the first resin layer 33 a thickness of 6 mm, the second elastomer layer 34 a thickness of 1.5 mm, the third resin layer 35 a thickness of 5.5 mm and the outer layer 36 a thickness of 1.5 mm.

For the manufacture of this housing, a compression prestress is applied to the ceramic rings as shown in FIG. 5. On a mandrel 40 mounted rotatably on roller supports 41-42 is placed a fixed stop 43 adapted to receive the end piece 21. On the mandrel 40 is slipped the end piece 21, then the alumina rings 26 with their seals 28. The assembly then has the configuration shown in FIG. 4A. At the right end of the series of rings is slipped the end piece 22, then a mobile stop 44 which is screwed on a threading of the mandrel while compressing the joints as shown in FIG. 4B. The first layer 33 is then applied by winding helically on the previously completed assembly the epoxy-impregnated glass-fiber wicks with a relatively high pitch to better resist the traction. The winding is obtained by many back and forth movements, turning at each end around the stops 43 and 44. During polymerization, the compression is maintained on the seals, and the mandrel 40 is made to turn by applying downward forces on its ends through roller devices 45-46 in order to compensate for the deflection created by the weight suspended between the supports 41-42. After polymerization, the epoxy surrounding the stops 43 and 44 is cut out, and the layer 33 is machined to the desired diameter. One then proceeds with the application of the elastomer coating 34. A second filament winding similar to the first is carried out to form the layer 35 and, after machining to the desired diameter, the last layer 36 of the epoxy impregnated fabric is wound. The ends of the housing are machined in conical form, and the ferrules 37 and 38, coated with glue, are force-fit on these conical ends.

The housing is then ready to receive the end connection heads and the internal support for the transducers.

A nonconducting housing has thus been obtained which meets the requirements of resistance to the environmental conditions encountered during operations in boreholes.

The housing and method just described can obviously form the subject of many variants without departing from the framework of the invention.

What is claimed is:

1. Sonde housing for logging apparatus, adapted to receive transducers for the acquisition of measurements in boreholes, comprising:
   (a) end pieces
   (b) a stack of ceramic rings arranged coaxially between said end pieces to form a hollow cylinder resistant to borehole pressure, said hollow cylinder defining an inner space for receiving the transducers,
   (c) a layer of reinforced plastic material placed coaxially of, and outside the stack of rings and fixed to the end pieces to resist longitudinal forces applied to the end pieces, and elastic seals received in peripheral grooves formed in the ceramic rings at the interface of each pair of adjacent rings, the longitudinal dimension of each seal at rest being larger than that of the respective groove, said seals being kept under compression by said layer of elastic material, whereby, during surface manipulations of the housing, direct contact between the end faces of the successive rings is prevented and an axial compression force is applied to said rings and when the housing is subjected to borehole pressure, the seals can be compressed to a point where the end faces of adjacent ceramic rings contact each other.

2. Sonde housing according to claim 1 further comprising a layer of elastomer material placed around said layer of plastic material to improve the resistance of the layer of plastic material to deterioration by the borehole fluids.

3. Sonde housing according to claim 2 further comprising an additional layer of plastic material placed around the layer of elastomer material to protect the latter.

4. Sonde housing according to claim 3 further comprising an outer layer of more resilient plastic material to improve the shock resistance of said housing.

5. Sonde housing according to claim 1 characterized in that said ceramic rings are made of fritted alumina.

6. Sonde housing according to claim 1 characterized in that said layer of reinforced plastic material is a helical filament winding of glass fibers impregnated with thermosetting resin.

7. Sonde housing according to claim 6 characterized in that said filament winding has a high pitch for better resisting the traction forces which can be encountered in boreholes.

8. Sonde housing according to claim 1 further comprising at least one transducer placed on the outer surface of said ceramic rings and protected by said layer of reinforced plastic material.

9. Sonde housing according to claim 1 characterized in that said rings have a height between 0.5 and once their diameter.

* * * * *